May 22, 1945.　　　R. A. GOEPFRICH　　　2,376,686
BRAKE
Filed March 22, 1943　　　3 Sheets-Sheet 1

INVENTOR
RUDOLPH A. GOEPFRICH
BY
L. J. Plante

May 22, 1945. R. A. GOEPFRICH 2,376,686
BRAKE
Filed March 22, 1943 3 Sheets-Sheet 2

INVENTOR
RUDOLPH A. GOEPFRICH
BY
T. J. Plante

May 22, 1945.   R. A. GOEPFRICH   2,376,686
BRAKE
Filed March 22, 1943      3 Sheets-Sheet 3

INVENTOR
RUDOLPH A. GOEPFRICH
BY
S. J. Plante

Patented May 22, 1945

2,376,686

UNITED STATES PATENT OFFICE 2,376,686

BRAKE

Rudolph A. Goepfrich, South Bend, Ind., assignor to Bendix Aviation Corporation, South Bend, Ind., a corporation of Delaware Application March 22, 1943, Serial No. 479,961

12 Claims. (Cl. 188—152)

This invention relates to brakes, and particularly to hydraulic motors for actuating the shoes of a brake and mechanical means for transmitting force from the hydraulic motor to the shoes.

The primary object of this invention is to protect a hydraulic shoe applying motor or wheel cylinder from the heat generated by friction inside a brake drum, by positioning the motor partly or wholly outside the brake backing plate, "outside" meaning on the side opposite the brake shoes.

Accomplishment of the above object requires that means be provided for transmitting an equalized braking force to the shoes operated by the motor, said means being relatively movable to compensate for differences in the movement of the shoes necessary for full application thereof. In view of this, it is an object of my invention to provide a single cylinder having two pistons reciprocable therein, each of which pistons is adapted to actuate one of a pair of brake shoes.

A corollary object is to combine means for adjusting the position of the shoes to compensate for wear with the shoe applying device described above.

Other objects and features of my invention will become apparent during the course of the following description, reference being had therein to the accompanying drawings, in which.

Figure 1:
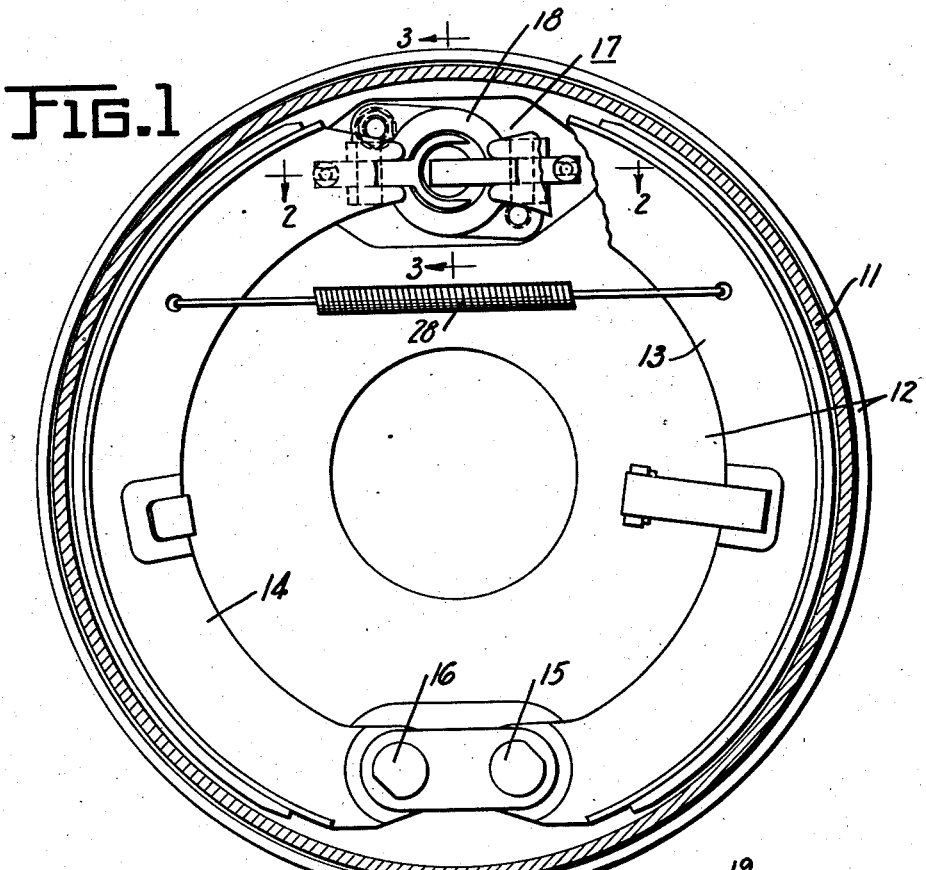
Figure 1 is a vertical section taken through a brake assembly on a plane just inside the head of the brake drum, showing the shoes in side elevation.
Figures 2, 4:
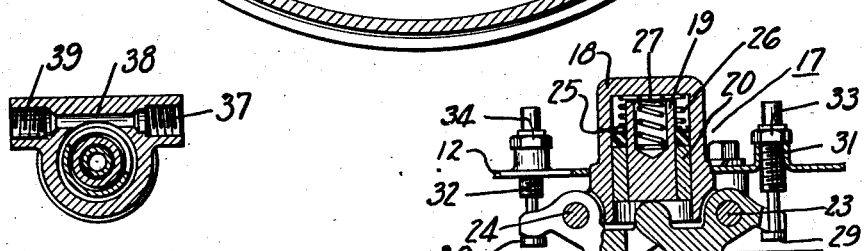
Figure 2 is a section taken on the line 2—2 of Figure 1.
Figure 4 is a section taken on the line 4—4 of Figure 3.

Referring to the brake assembly shown in Figures 1-4 inclusive, the brake comprises generally a rotatable brake drum 11, a stationary backing plate or support 12, two brake shoes 13 and 14 pivoted at 15 and 16 respectively on the backing plate 12, and means indicated generally at 17 for spreading the shoes against the brake drum to inhibit the rotation of the drum when desired.

The applying means 17 comprises a hydraulic cylinder 18 bolted to the backing plate, pistons 19 and 20 reciprocable in the cylinder, and bell cranks or rockers 21 and 22 pivoted respectively at 23 and 24 on ears of the cylinder, and adapted to be actuated respectively by the pistons 19 and 20 to expand the shoes 13 and 14.

Figure 3:
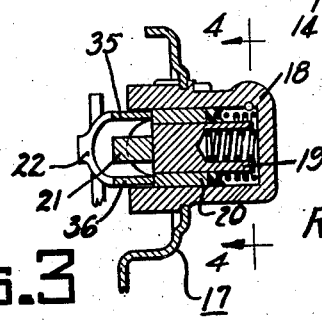
Figure 3 is a section taken on the line 3—3 of Figure 1.

Piston 19 is cylindrical in shape and is adapted to reciprocate inside piston 20 which is annular in shape, and which slides between piston 19 and the inner wall of cylinder 18. A single annular resilient seal 25 serves to prevent the escape of fluid from the cylinder, the seal having one lip lying along the wall of the cylinder and another lip lying along the outer cylindrical surface of piston 19, and having its base resting against the face of annular piston 20. A spring 26 holds the seal in place and cooperates with a spring 27 to urge the pistons 19 and 20 into contact with the rockers 21 and 22 respectively. The springs 26 and 27 are prevented from moving the shoe in a brake applying direction by a much stronger return spring 28 which is tensioned between the shoes tending to draw them together and consequently tending to pivot the rockers about their pivot points 23 and 24 and move them in the direction of the pistons in the cylinder. However, movement of the rockers toward the pistons is restricted by stops 29 and 30, which also serve as means for adjusting the position of the brake shoes to compensate for wear. The stops 29 and 30 are formed on threaded members 31 and 32 respectively which are screwed through the backing plate, and are locked in position by lock nuts 33 and 34. To adjust the brakes, the lock nuts 33 and 34 are loosened and the position of the threaded members 31 and 32 is changed. If the members 31 and 32 are adjusted toward the backing plate, the stops 29 and 30 will move the rockers about their pivots to force the shoes toward the brake drum. Thereupon springs 26 and 27, plus the residual hydraulic pressure which is maintained in the conventional hydraulic brake system will cause the pistons to follow out the rockers. As seen in Figure 3, rocker 22 is formed at its end adjacent piston 20 with yoke arms 35 and 36 which give it contact with the annular piston 20, and avoid the cylindrical piston 19.

The operation of my improved brake applying means is as follows. As hydraulic fluid under pressure is forced from a master cylinder (not shown) it moves into the cylinder 18 through a port 37 and a passage 38 (see Figure 4—the opposite port 39 serves as a bleed opening). The pressure of the fluid forces the pistons 19 and 20 in the direction of the rockers 21 and 22. The rockers in turn pivot at 23 and 24 respectively and translate the applying force exerted against them by the pistons into force tending to move the shoes 13 and 14 against the brake drum 11. Since the pistons 19 and 20 are movable relatively to one another, the distance through which each of the rockers will move will depend on the distance through which the corresponding shoe moves. The pressures exerted against the shoes will depend entirely on pressures exerted against the pistons and assuming the pressure responsive areas of the pistons are equal, the force exerted on the shoes will be equal. Because each of the shoes is applied by its own piston, the device has the same flexibility or fluidity of movement of any hydraulic brake, while at the same time a single cylinder having two pistons therein takes the place of a plurality of cylinders each having a single piston.

Figure 5:
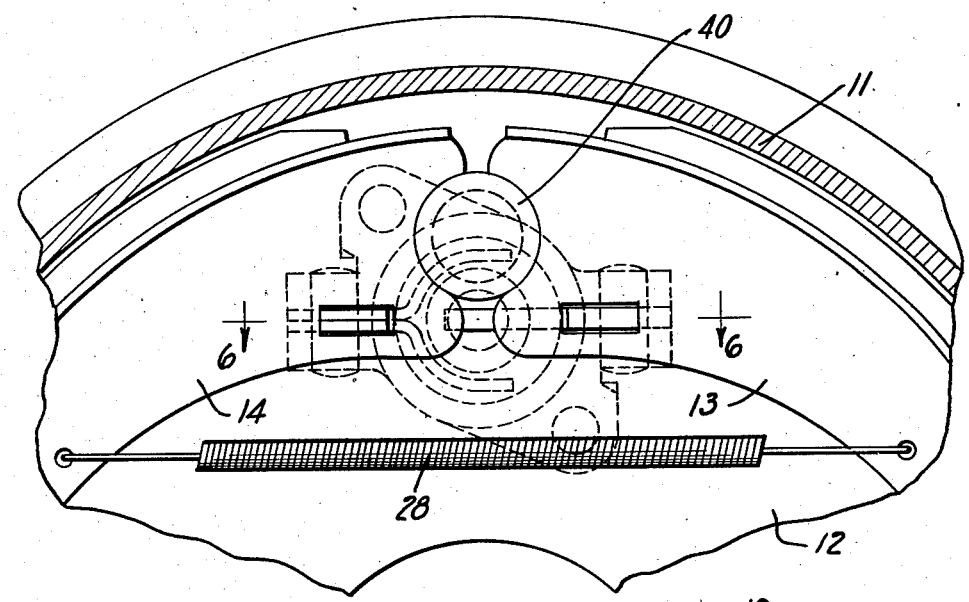
Figure 5 is a section showing part of a brake assembly incorporating a modification of the shoe applying means of Figure 1.
Figure 6:
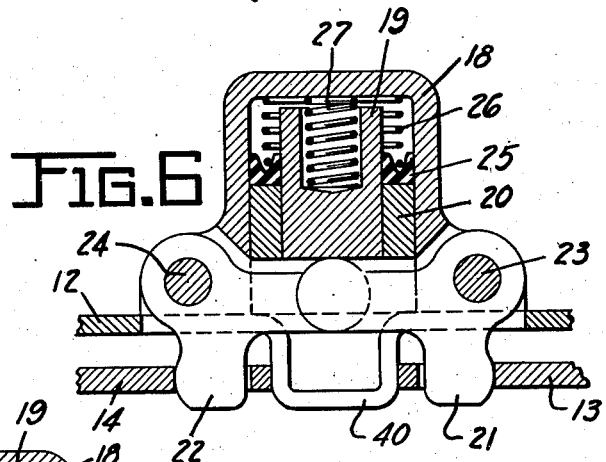
Figure 6 is a section taken on the line 6—6 of Figure 5.

The applying means shown in Figures 5 and 6 is the same as that shown in Figures 1-4, except that it has no means for adjusting the position of the brake shoes, and that an anchor 40 (which, as shown, is a raised portion of the backing plate) is provided between the ends of the shoes 13 and 14 adjacent the applying means. Thus the device of Figures 5 and 6 is adapted to apply a brake of the full floating type, in which a pair of shoes is connected together at one end by an adjustable link and anchor at the other end through either one shoe or the other depending on the direction of drum rotation.

Figure 7:
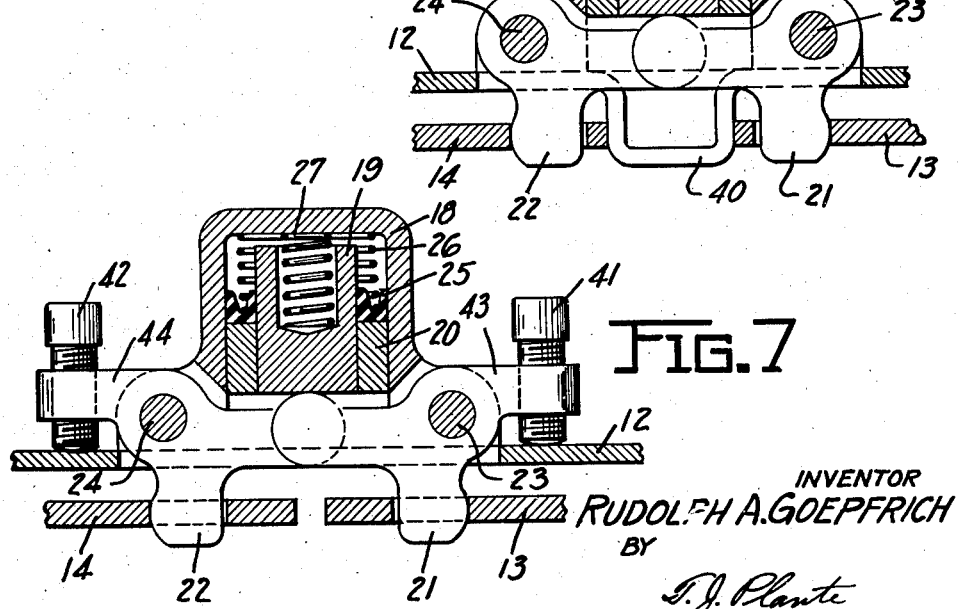
Figure 7, 8 and 9 are sections of brake assemblies incorporating further modifications of the shoe applying means shown in Figures 2 and 6.

The modification of Figure 7 corresponds to the modification of Figure 6, except that it shows adjusting screws 41 and 42 which vary the position of ears 43 and 44 on the rockers to adjust the position of the shoes, and that it has no anchor for the shoes (they being pivoted at the opposite end as shown in Figure 1). Figures 6 and 7 both differ from Figure 2 in having the whole body of the cylinder outside the backing plate.

Figure 8:
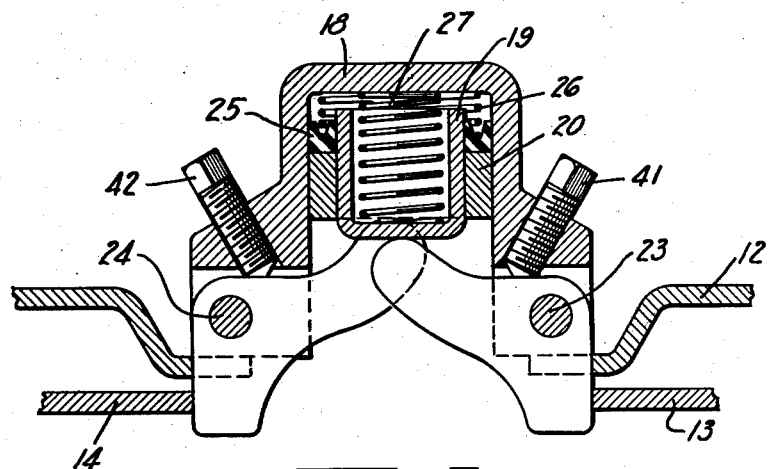

The modification of Figure 8 is similar to that of Figure 7, except that the adjusting screws 41 and 42 extend through the casing of the cylinder and bear against the same arms of the bell cranks which receive applying pressure from the pistons.

Figure 9:
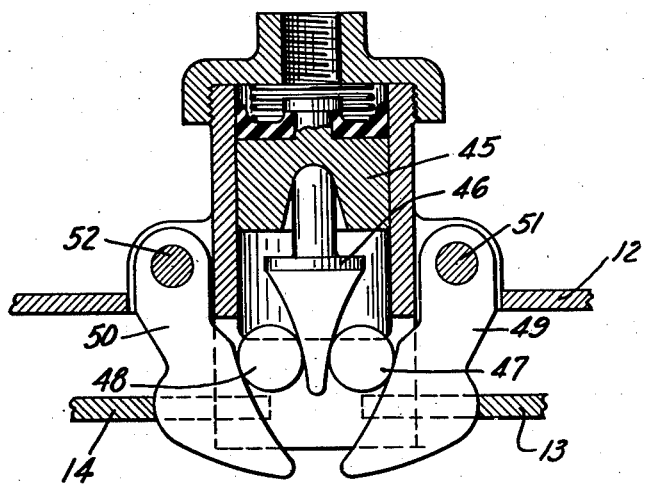

The device of Figure 9 shows a single piston 45 in the cylinder, a wedge 46 which is actuated by the piston and which is capable of swivelling movement relative to the axis of the piston, rollers 47 and 48 which are forced outwardly by the wedge 46 as it moves outwardly with respect to the cylinder, and levers 49 and 50 pivoted at 51 and 52 respectively, which swing outwardly under the influence of the rollers to force the shoes against the drum.

Although I have described certain specific embodiments of my invention, it is not my intention that the scope of invention be limited to such embodiments or be limited in any manner except by the terms of the appended claims.

I claim:

1. A brake comprising a stationary backing plate, two shoes each pivoted at one end on the backing plate, a single bore hydraulic cylinder mounted on the backing plate adjacent the free ends of the shoes and having its axis along a line normal to the plane of the backing plate, said hydraulic cylinder being positioned on the outside of the backing plate with respect to the shoes, two pistons reciprocable in said cylinder, and means for connecting each of the pistons to the free end of one of the shoes for actuating the same.

2. A brake comprising a stationary backing plate, two shoes each pivoted at one end on the backing plate, a hydraulic cylinder mounted on the backing plate adjacent the free ends of the shoes and having its axis along a line normal to the plane of the backing plate, said hydraulic cylinder being positioned on the outside of the backing plate with respect to the shoes, two pistons reciprocable in said cylinder, one of said pistons being cylindrical and the other being annular and lying between the cylindrical piston and the cylinder, and means for connecting each of the pistons to the free end of one of the shoes for actuating the same.

3. A brake comprising a stationary backing plate, two shoes each pivoted at one end on the backing plate, a single bore hydraulic cylinder mounted on the backing plate adjacent the free ends of the shoes and having its axis along a line normal to the plane of the backing plate, said hydraulic cylinder being positioned on the outside of the backing plate with respect to the shoes, two pistons reciprocable in said cylinder, and means for connecting each of the pistons to the free end of one of the shoes for actuating the same, said means comprising two rockers each pivoted on a stationary portion of the brake and each serving to transmit force from one of the pistons to one of the shoes.

4. A brake comprising a stationary backing plate, two shoes each pivoted at one end on the backing plate, a hydraulic cylinder mounted on the backing plate adjacent the free ends of the shoes and having its axis along a line normal to the plane of the backing plate, said hydraulic cylinder being positioned on the outside of the backing plate with respect to the shoes, two pistons reciprocable in said cylinder, one of said pistons being cylindrical and the other being annular and lying between the cylindrical piston and the cylinder, means for connecting each of the pistons to the free end of one of the shoes for actuating the same, said means comprising two rockers each pivoted on a stationary portion of the brake and each serving to transmit force from one of the pistons to one of the shoes.

5. A brake comprising a stationary backing plate, two shoes each pivoted at one end on the backing plate, a hydraulic cylinder mounted on the backing plate adjacent the free ends of the shoes and having its axis along a line normal to the plane of the backing plate, said hydraulic cylinder being positioned on the outside of the backing plate with respect to the shoes, two pistons reciprocable in said cylinder, and means for connecting each of the pistons to the free end of one of the shoes for actuating the same, said means comprising two rockers each pivoted on a stationary portion of the brake, one of which is in contact with the cylindrical piston and with one of the shoes to transmit force therebetween, and the other of which is formed with a yoke at one end to contact the annular piston and transmit force between said annular piston and the other of said shoes.

6. A brake comprising a stationary backing plate, two brake shoes, means for anchoring said shoes, a single bore hydraulic cylinder mounted on the backing plate adjacent the applying ends of the shoes and having its axis along a line normal to the plane of the backing plate, said hydraulic cylinder being positioned on the outside of the backing plate with respect to the shoes, two pistons reciprocable in said cylinder, and means for connecting each of the pistons to the free end of one of the shoes for actuating the same.

7. A brake comprising a stationary backing plate, two brake shoes, means for anchoring said shoes, a hydraulic cylinder mounted on the backing plate adjacent the applying ends of the shoes and having its axis along a line normal to the plane of the backing plate, said hydraulic cylinder being positioned on the outside of the backing plate with respect to the shoes, two pistons reciprocable in said cylinder, one of said pistons being cylindrical and the other being annular and lying between the cylindrical piston and the cylinder, and means for connecting each of the pistons to the free end of one of the shoes for actuating the same.

8. A brake comprising a stationary backing plate, two brake shoes, means for anchoring said shoes, a single bore hydraulic cylinder mounted on the backing plate adjacent the applying ends of the shoes and having its axis along a line normal to the plane of the backing plate, said hydraulic cylinder being positioned on the outside of the backing plate with respect to the shoes, two pistons reciprocable in said cylinder, and means for connecting each of the pistons to the free end of one of the shoes for actuating the same, said means comprising two rockers each pivoted on a stationary portion of the brake and each serving to transmit force from one of the pistons to one of the shoes.

9. A brake comprising a stationary backing plate, two brake shoes, means for anchoring said shoes, a hydraulic cylinder mounted on the backing plate adjacent the applying ends of the shoes and having its axis along a line normal to the plane of the backing plate said hydraulic cylinder being positioned on the outside of the backing plate with respect to the shoes, two pistons reciprocable in said cylinder, one of said pistons being cylindrical and the other being annular and lying between the cylindrical piston and the cylinder, and means for connecting each of the pistons to the free end of one of the shoes for actuating the same, said means comprising two rockers each pivoted on a stationary portion of the brake and each serving to transmit force from one of the pistons to one of the shoes.

10. A brake comprising a stationary backing plate, two brake shoes, means for anchoring said shoes, a hydraulic cylinder mounted on the backing plate adjacent the applying ends of the shoes and having its axis along a line normal to the plane of the backing plate, said hydraulic cylinder being positioned on the outside of the backing plate with respect to the shoes, two pistons reciprocable in said cylinder, one of said pistons being cylindrical and the other being annular and lying between the cylindrical piston and the cylinder, and means for connecting each of the pistons to the free end of one of the shoes for actuating the same, said means comprising two rockers each pivoted on a stationary portion of the brake, one of which is in contact with the cylindrical piston and with one of the shoes to transmit force therebetween, and the other of which is formed with a yoke at one end to contact the annular piston and transmit force between said annular piston and the other of said shoes.

11. In a brake having a plurality of brake shoes, a hydraulic actuator comprising a cylinder, an annular piston reciprocable in the cylinder, and a cylindrical piston reciprocable in the annular piston, said pistons being individually connected to separate shoes to actuate the same.

12. In a brake having a plurality of brake shoes, a hydraulic actuator comprising a cylinder, an annular piston reciprocable in the cylinder, a cylindrical piston reciprocable in the annular piston, said pistons being individually connected to separate shoes to actuate the same, and an annular seal having its base against the face of the annular piston and having two annular lips which are respectively slidable along the inner wall of the cylinder and the outer surface of the cylindrical piston.

RUDOLPH A. GOEPFRICH.